(12) United States Patent
Picozza et al.

(10) Patent No.: US 10,874,248 B2
(45) Date of Patent: Dec. 29, 2020

(54) AUTOMATIC DRIP COFFEE MAKER

(71) Applicant: Sunbeam Products, Inc., Boca Raton, FL (US)

(72) Inventors: Augusto A. Picozza, Boca Raton, FL (US); Damien Vizcarra, Pasadena, CA (US); Sandra Lin, Appleton, WI (US)

(73) Assignee: Sunbeam Products, Inc., Boca Raton, FL (US)

( * ) Notice: Subject to any disclaimer, the term of this patent is extended or adjusted under 35 U.S.C. 154(b) by 282 days.

(21) Appl. No.: 16/061,879

(22) PCT Filed: Dec. 14, 2016

(86) PCT No.: PCT/US2016/066667
§ 371 (c)(1),
(2) Date: Jun. 13, 2018

(87) PCT Pub. No.: WO2017/106353
PCT Pub. Date: Jun. 22, 2017

(65) Prior Publication Data
US 2018/0360261 A1 Dec. 20, 2018

Related U.S. Application Data

(60) Provisional application No. 62/266,897, filed on Dec. 14, 2015.

(51) Int. Cl.
*A47J 31/56* (2006.01)
*A47J 31/06* (2006.01)
*A47J 31/44* (2006.01)

(52) U.S. Cl.
CPC ......... *A47J 31/56* (2013.01); *A47J 31/0631* (2013.01); *A47J 31/44* (2013.01)

(58) Field of Classification Search
CPC ......... A47J 31/56; A47J 31/44; A47J 31/0631
See application file for complete search history.

(56) References Cited

U.S. PATENT DOCUMENTS

| 4,414,884 | A |   | 11/1983 | Mclean |
| 4,825,759 | A |   | 5/1989 | Grome et al. |
| 5,503,060 | A | * | 4/1996 | Morecroft ........... A47J 31/0573 99/295 |
| 6,557,584 | B1 | * | 5/2003 | Lucas ................... A47J 31/461 137/613 |
| 7,503,253 | B2 | * | 3/2009 | Rahn ....................... A47J 31/56 99/280 |

* cited by examiner

*Primary Examiner* — Ryan J. Walters
(74) *Attorney, Agent, or Firm* — Husch Blackwell LLP (57) ABSTRACT

A coffee maker having a water reservoir, a brew head assembly positioned in front of the water reservoir including a shower head member, a pivotally movable brew basket, and a water reservoir fill port located in front of the coffee maker within the brew head assembly, the water reservoir fill port being in direct communication with the water reservoir such that water can be poured directly into the water reservoir fill port over the top of the shower head member and brew basket to fill the water reservoir. The shower head member includes a first flow channel for delivering heated water to the brew basket and at least one second flow channel having at least one opening associated therewith for allowing steam generated within the brew basket to be channeled back to the water reservoir. A separate compartment for holding and storing a measuring spoon is also provided.

17 Claims, 5 Drawing Sheets

AUTOMATIC DRIP COFFEE MAKER

CROSS-REFERENCE TO RELATED APPLICATION

This patent application claims benefit of U.S. Provisional Patent Application Ser. No. 62/266,897 filed Dec. 14, 2015.

BACKGROUND OF THE INVENTION

The present invention relates generally to automatic drip coffee makers and, more particularly, to a coffee maker having improved usability including front and center access to the water tank fill port for filling the water reservoir thereby minimizing forward movement of the coffee maker; an improved shower head design for returning steam generated during the brewing process back to the water reservoir for condensation; easier access to the brew basket; optimizing the distance between the heater outlet, the shower head, and the water reservoir full mark to improve performance; and providing a closed compartment for a measuring spoon with easy access.

A wide variety of different types of automatic drip coffee makers are presently available in the marketplace, all of which include a housing for enclosing a water reservoir, a brew basket for receiving coffee grounds, a warming plate for holding and warming a coffee carafe, a heating element for heating the water housed within the water reservoir, a shower head for distributing heated water to the brew basket and over the coffee grounds, and appropriate circuitry and controls for controlling the various operations of the coffee maker. Although most coffee makers include these common components, the relative position of these components within a particular coffee maker varies widely and different configurations yield different results both operationally and performance wise.

For example, the water reservoir is typically located at the rear of the coffee maker and typically includes a separate access opening for allowing a user to fill the reservoir directly with water. Typically the brew basket is located in front of the water reservoir and necessitates forward movement of the coffee maker in order to access the inlet opening to the water reservoir. See, for example, U.S. Pat. No. 5,251,541 wherein the water reservoir is located behind the brew basket. In addition, some coffee makers have a pull-out or slide-in filter basket as illustrated in U.S. Pat. No. 5,251,541 whereas other coffee makers include rotatable brew baskets such as the brew basket disclosed in U.S. Pat. No. 8,042,454. Still other coffee makers include top-loading brew baskets such as those disclosed in U.S. Pat. Nos. 7,146,904 and 6,892,627.

All of these different types of automatic drip coffee makers have been developed in order to accommodate different requirements and uses, but all require either filling the water reservoir through an access door located behind the brew basket, or through apertures or small inlet openings or channels positioned at least partially circumferentially adjacent the brew basket to one side thereof as illustrated in U.S. Pat. Nos. 8,042,454 and 7,146,904. In addition, as illustrated in U.S. Pat. No. 7,146,904, a complicated linkage mechanism connects two separate covers causing the rear cover, which provides access to the water reservoir, to be opened when the front cover, which provides access to the brew basket, is opened, and which also enables the rear cover to be opened separately. Here again, the rear cover provides separate access to the water reservoir to speed up the filling process. In those coffee makers where water is introduced into the water reservoir by pouring the water directly into the reservoir located behind the brew basket at the rear of the coffee maker, such units tend to have a deeper overall profile and such units also require a user to reach over the brew basket in order to fill the water reservoir. In those coffee makers where a small inlet port or channel is provided up front or alongside the brew basket for filling the water reservoir, such configurations include increased components and structure and add to the overall width and complexity of such units.

It is also common in most automatic drip coffee makers for steam produced during the brewing process to overflow and exit the front and side portions of the coffee maker through openings associated with the mating parts of the brew basket, housing and various covers associated therewith. This steam or water condensation is typically lost and either evaporates into the atmospheric air surrounding the coffee maker or condenses outside of the coffee maker depending upon the amount of condensation produced during the brewing process.

It is therefore desirable to provide a mechanism for filling the water reservoir which eliminates the need to pull the entire unit forward or to pour over the brew basket, thereby eliminating the need for additional maneuvering space around the coffee maker. It is also desirable to provide an improved shower head design which captures the steam and condensation produced during the brewing cycle and returns such moisture to the water tank during the brewing cycle. Other usability improvements can likewise be directed to optimizing distances between the heater outlet and shower head, and between the heater outlet and the top of the water reservoir full mark to minimize heat loss and to improve overall performance.

Accordingly, the present invention is directed to various improvements to an automatic drip coffee maker which overcomes one or more of the problems set forth above.

SUMMARY OF THE INVENTION

The present invention overcomes many of the shortcomings and limitations of the prior art automatic drip coffee makers discussed above and teaches the construction and operation of a coffee maker with improved usability features and improved performance characteristics. In one aspect of the present invention, the present coffee maker includes a housing incorporating the water reservoir and other electronics for heating up the water stored in the water reservoir, for activating the warming plate associated with the front portion of the housing, and for providing power to the control panel for controlling the brewing operation. The water reservoir for storing water used for the brewing process is located behind the brew head assembly structure which houses the brew basket and the shower head. The brew head assembly also includes a water tank fill port located above the brew basket and shower head and in front of the water reservoir wherein water can be poured directly into the water tank fill port over the top of the brew head assembly directly into the water reservoir. A cover or lid is pivotally attached to the top portion of the water tank fill port and allows a user to easily raise the fill port lid to provide easy access to the fill port at the front portion of the coffee maker.

Location of the water tank fill port at the front portion of the coffee maker eliminates the need for a user to pull the unit forward so as to gain access to the water reservoir which is located at the rear portion of the housing and behind the brew head assembly. In this regard, the water tank fill port includes an incline floor surface which slopes to an inlet opening which provides access to the water reservoir located behind the brew basket. As such, the water reservoir can be filled by introducing water into the water tank fill port located above the brew basket and shower head without physically accessing the water reservoir itself. Although the water reservoir likewise includes an access cover for providing direct access to the water reservoir located behind the brew basket, the water reservoir is intended to be filled by using the water tank fill port located above the brew basket assembly.

Attached to the front wall portion of the housing is a mounting structure for holding the brew head assembly which includes the brew basket, shower head, and water tank fill port. This assembly includes a bracket fixedly mounted to the front wall portion of the housing and a cylindrical support member which houses the water tank fill port, the shower head and a pivotally mounted brew basket door assembly located below the shower head. The present shower head is fixedly mounted within the cylindrical support member associated with the brew head assembly and is located below the water tank fill port. The brew basket is located in a pivotally mounted support member which is selectively rotatable between a closed position wherein the brew basket is located directly under the shower head and the water tank fill port for brewing a coffee beverage, and an open position which provides easy access to the brew basket for filling the same with coffee grounds before brewing a coffee beverage. The brew basket support member pivots about a pivot axis located on one side of the assembly and rotates forward and laterally through approximately 160° so as to provide easy access to the brew basket at the front thereof so that the unit again does not need to be pulled forward or otherwise maneuvered to access the brew basket.

The present shower head which provides heated water to the brew basket during the brewing process is located immediately above the brew basket when the brew basket support member is in its closed position and is permanently attached to the cylindrically shaped flange member situated immediately above the brew basket and the brew basket support member. The present shower head design includes a conventional mechanism for providing and delivering heated water to the brew basket but, in addition, also includes a plurality of openings located adjacent the shower head openings so that steam formed within the brew basket can enter the plurality of openings in the shower head and can be funneled back into the water tank. These plurality of openings are provided within a specially oriented flow channel which allows the steam generated during the brewing cycle to be directed therethrough, the flow channel terminating with access to the water reservoir. As steam enters the plurality of openings, the condensation formed thereby is channeled through the flow channel which opens back into the water reservoir. This flow channel collection returns moisture from the steam which evaporates from the hot water used to fill the brew basket. Typically, the same would stay within the brew basket and exit through seams and/or other openings or cracks associated with the brew basket cover and other mating parts to the exterior of the coffee maker. The present shower head design redirects this steam back to the water reservoir and aids in directing such condensed water back into the water reservoir to fill the same. This mechanism avoids excess steam exiting the coffee maker and condensing on counter tops, overhanging cabinets and the environment exterior to the coffee maker.

The access cover for providing direct access to the water reservoir likewise includes a separate compartment for storing a measuring spoon which can be used to add ground coffee to the brew basket. This compartment includes a cavity specifically sized and shaped to fully receive and store a measuring spoon therewithin and likewise includes a separate lid member for providing access to the measuring spoon compartment.

Still further, the location of the water reservoir, heater element outlet and shower head have been optimized such that the relative distances therebetween have been shortened or minimized so as to minimize heat loss and to improve the overall performance of the coffee maker. The vertical distance between the outlet of the heating element used to heat the water stored in the water reservoir during the brewing cycle and the shower head as well as the vertical distance between the top of the water reservoir full mark and the heater outlet have been minimized to more efficiently operate the present coffee maker including faster heating of the water stored within the water reservoir and a shorter travel distance for transporting heated water to the present shower head.

All of the above-referenced improvements are designed for allowing easy frontal access for both filling the water reservoir and for having access to the brew basket thereby eliminating any need to pull the coffee maker unit forward when stored beneath an overhanging cabinet or other restricted location on a countertop.

Additional features of the present invention will be described in the course of the following detailed description.

These and other objects and advantages of the present invention will become apparent to those skilled in the art after consideration of the following specification taken in conjunction with the accompanying drawings.

BRIEF DESCRIPTION OF THE DRAWINGS

For a better understanding of the present invention, reference may be made to the following accompanying drawings.

While the present disclosure is susceptible to various modifications and alternative forms, a specific embodiment of the present invention is shown by way of example in the present drawings and will be hereinafter described in detail. It should be understood, however, that the present drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

Figures 1, 2:
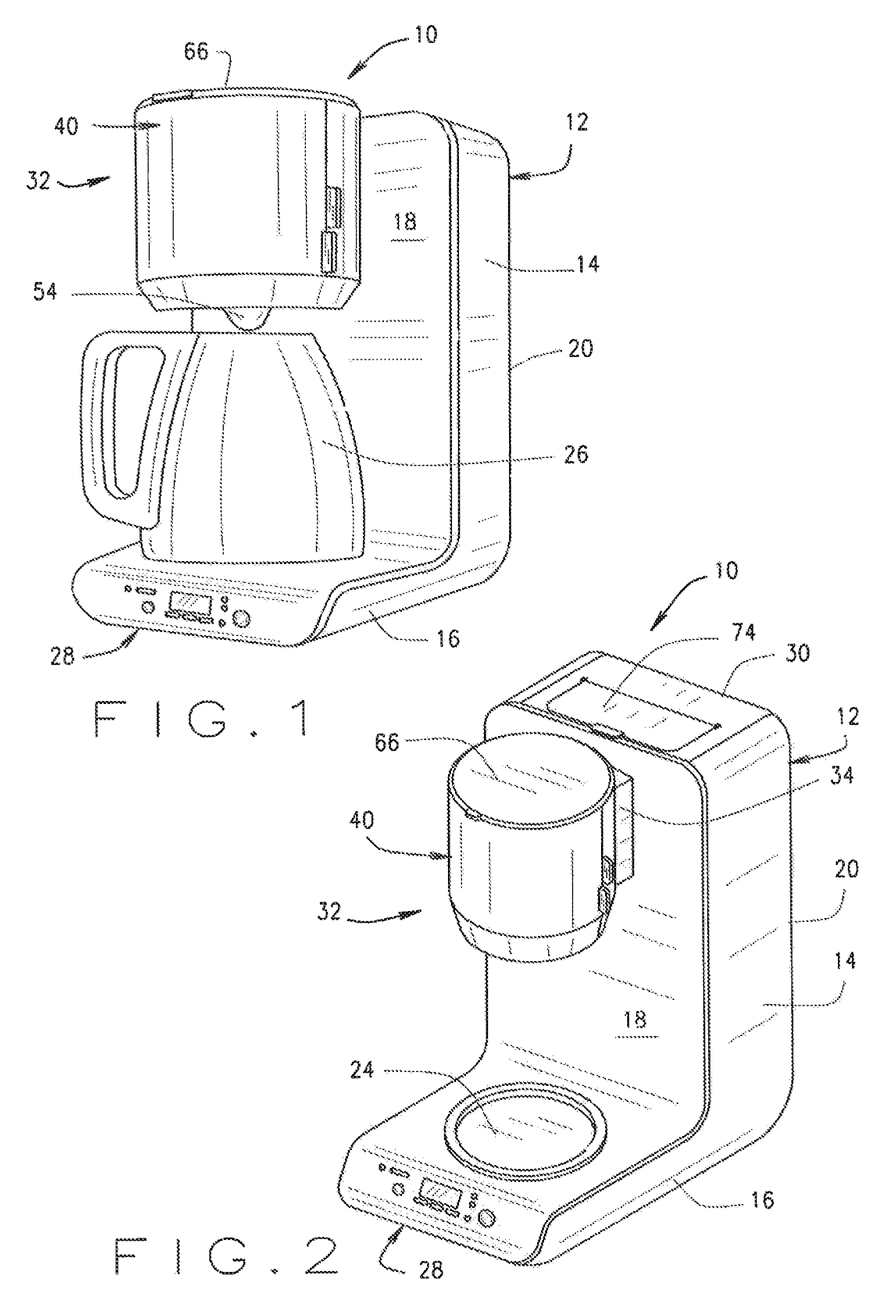
FIG. 1 is a perspective view of the present coffee maker constructed in accordance with the teachings of the present invention.
FIG. 2 is a perspective view of the present coffee maker with the coffee carafe removed and showing the various cover members associated with the water tank fill port, the measuring spoon storage compartment, and the water reservoir.
Figure 9:
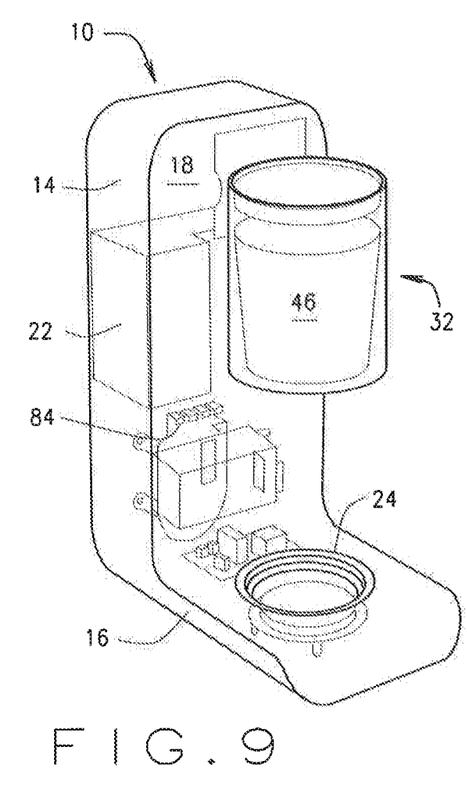
FIG. 9 is a front perspective view of the present coffee maker showing some of the internal components associated therewith.
Figure 10:
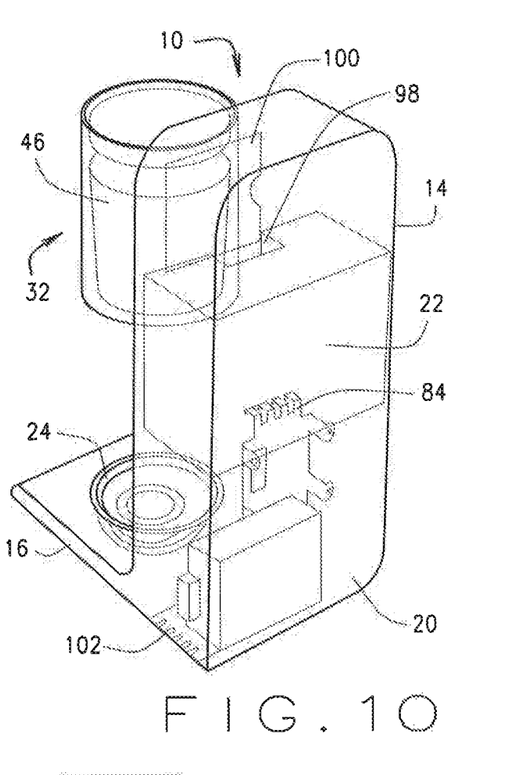
FIG. 10 is a rear perspective view of the present coffee maker similar to FIG. 9 showing some of the internal components associated therewith.
Figure 11:
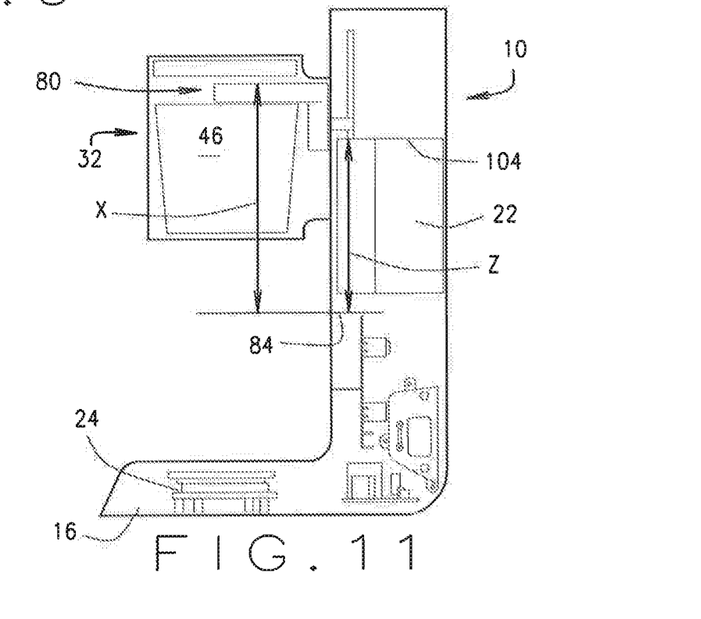
FIG. 11 is a side elevational view of the present coffee maker showing some of the internal components associated therewith.

Referring to the drawings more particularly by reference numerals Wherein like numerals refer to like parts, number 10 in FIGS. 1 and 2 identifies one embodiment of a coffee maker constructed according to the teachings of the present invention which incorporates the improved usability features discussed above. More particularly, the present coffee maker 10 includes a housing member 12 which is substantially L-shaped in configuration and includes a vertically oriented housing component 14 and a horizontally oriented housing component 16. The vertical housing member 14 includes a front wall member 18 and a rear wall member 20 and houses therebetween in its upper portion water reservoir 22 as best illustrated in FIGS. 9-11. The horizontally oriented housing member 16 includes a warming plate 24 for capturing and holding a typical coffee carafe 26 as best illustrated in FIG. 1. The front portion of the housing member 16 includes a control panel 28 for controlling the operation of the coffee maker 10 including controlling such features as delaying the brewing cycle and selecting a brewing start time, selecting a brewing strength, initiating the brewing cycle now, selecting a clean cycle, an on/off switch and other controllable features. The warming plate 24 includes a receptacle for receiving the coffee carafe 26 as best illustrated in FIG. 2. The top portion of the vertically oriented housing member 14 includes a slideable cover member 30 for providing direct access into the water reservoir 22 as will be hereinafter further explained.

Figure 3:
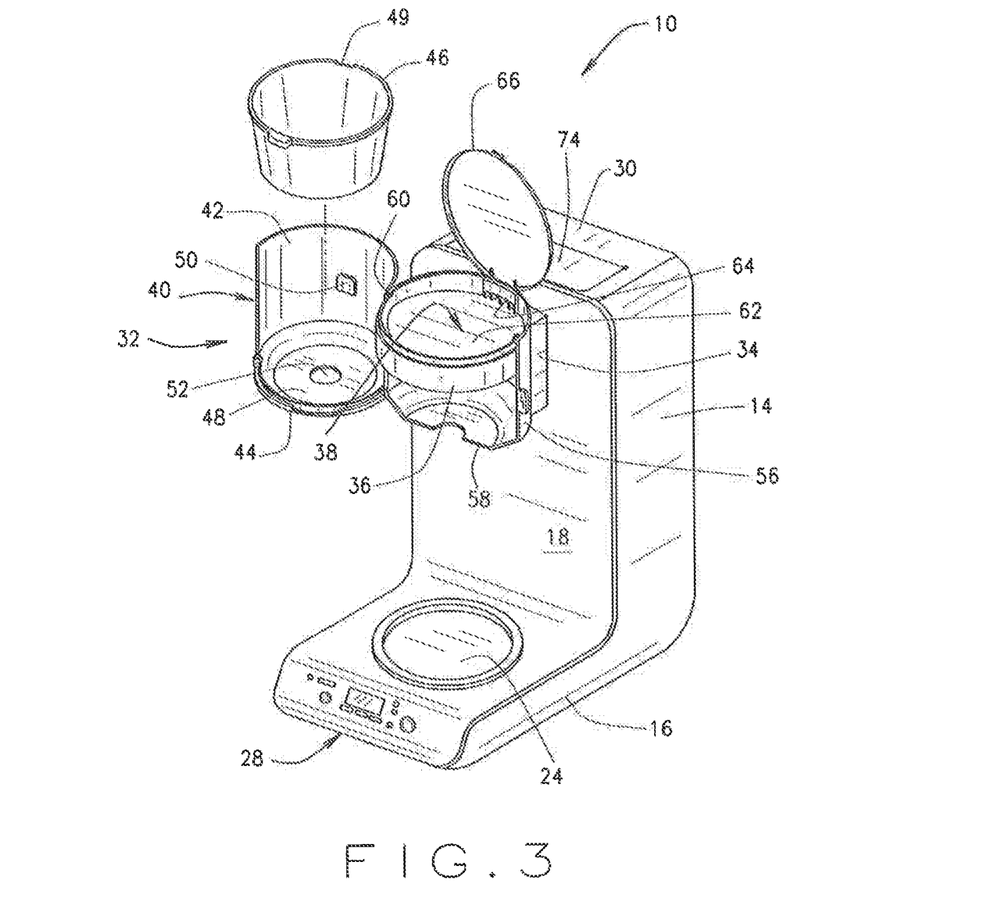
FIG. 3 is an exploded perspective view showing the brew basket support member in its open position, the water tank fill port cover member in its open position, and the brew basket removed from the brew basket support member.
Figure 4:
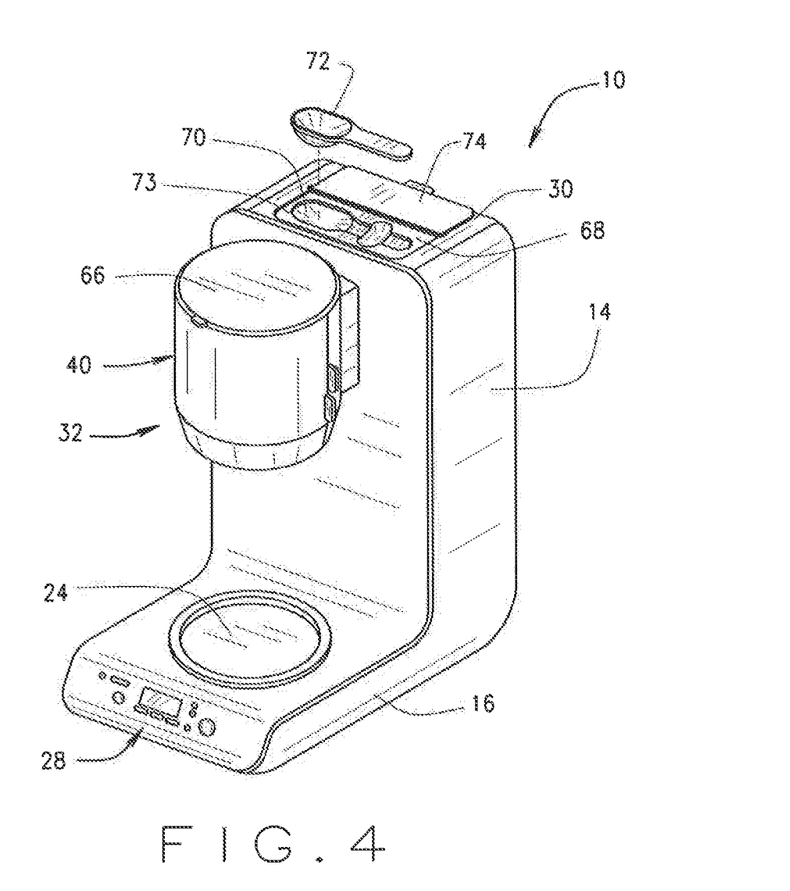
FIG. 4 is a partially exploded perspective view showing the measuring spoon compartment in its open position and a measuring spoon positioned for reception within the compartment.

A brew head assembly 32 as best illustrated in FIGS. 1-4 is mounted to the front wall portion 18 of the vertically oriented housing member 14. The brew head assembly 32 is best illustrated in FIG. 3 and includes a mounting bracket 34 fixably attached to the front wall housing member 18 and a cylindrical flange member 36 which houses the present shower head member 80 as will be hereinafter further described and further forms the water tank fill port or opening 38 as will be likewise further explained. The brew head assembly 32 further includes a pivotally rotating brew basket support member 40 which functions as a door member and is selectively pivotally movable between a fully closed position as illustrated in FIGS. 1, 2 and 4, and an open position as illustrated in FIG. 3. The brew basket support member 40 includes a front wall portion 42 and a floor member 44 for receiving and holding a brew basket 46 therewithin. The floor member 44 includes a cavity or receptacle 48 as well as a flange member 50 for further receiving and holding a brew basket 46. When the brew basket support member 40 is in its closed position, the brew basket 46 is positioned directly below the shower head member 80 in position for brewing a coffee beverage.

It is recognized and anticipated that any conventional mechanism can be used to receivably insert and remove the brew basket from brew basket support member 40 and that such mechanisms are well known in the industry. In this regard, the brew basket 46 includes corresponding structure in the form of an indentation or channel 49 for receiving the flange member 50 and for nesting within the receptacle 48. A hole or opening 52 is located at the center of the floor member 44 for receiving the valve mechanism 54 (FIG. 1) associated with the brew basket 46. When in its closed position, the brew basket support/door member 40 mates with the flange member 36 as well as with a corresponding partial cylindrical wall member 56 so as to completely close off and seal the brew basket 46 between the members 36, 40 and 56 and within the brew head assembly 32. In this regard, the floor member 44 of the brew basket support member 40 is insertably received above the partial floor portion 58 associated with the wall member 56 and, when in its closed position, the brew basket support member 40 positions the brew basket directly below the shower head member 80 and the water tank fill port 38 as will be hereinafter further explained. The brew basket support/door member 40 rotates forward and laterally as compared to the water tank fill port 38 and the cylindrical flange member 36 so as to provide easy open access to the brew basket from the front portion of the coffee maker 10. In this regard, the brew basket support/door member 40 pivots about pivot axis 60 located on one side of the brew head assembly 32 through approximately 160° as best illustrated in FIG. 3.

The water tank fill port 38 is located directly above the present shower head member 80 and the brew basket 46 when the brew basket support member 40 is positioned in its closed position. The water tank fill port 38 is in direct communication with water reservoir 22 and includes an incline floor member 62 which slopes from front to rear and further includes at least one opening or channel 64 which passes completely through the front wall member 18 of the housing member 14 and exits directly into the water reservoir 22. This allows a user to fill the water reservoir 22 from the front of the coffee maker 10 by pouring water directly over the brew head assembly 32 into the fill port 38 thereby eliminating any need for pulling the present coffee maker 10 forward or otherwise maneuvering or moving the coffee maker 10 in any manner when filling the water reservoir 22. This also eliminates the need to pour water directly into the water reservoir 22 located behind the brew head assembly 32 through cover member 30. A pivotally attached lid member 66 provides access to the water tank fill port 38 as best illustrated in FIGS. 2-4. Although the floor member 62 of the water tank fill port 38 is preferably inclined from front to rear, it is recognized and anticipated that the floor member 62 could likewise be horizontally oriented so long as the exit port 64 is positioned and located above floor member 62. The floor member 62 also functions as a ceiling member for the shower head 80 as will be hereinafter further explained.

Figure 5:
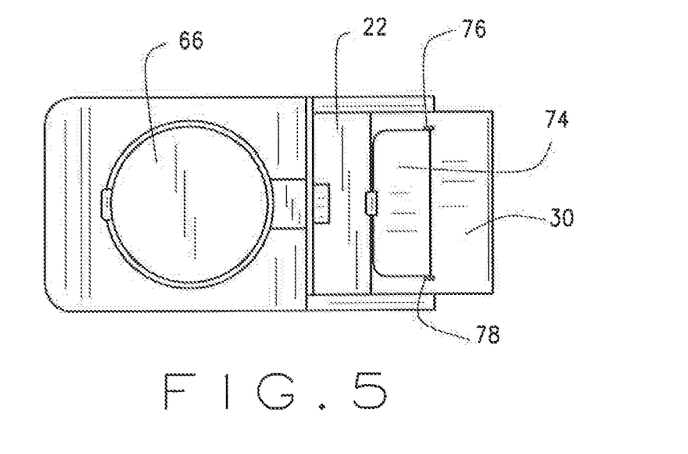
FIG. 5 is a top plan view of the present coffee maker showing the water reservoir cover member in its open position.

As best illustrated in FIGS. 4 and 5, the water reservoir 22 may include a separate cover member 30 for providing access directly to the water reservoir 22. Cover member 30 is slidably positionable between a fully closed position completely covering access to the water reservoir 22 as best illustrated in FIGS. 2-4 and an open position providing access to the water reservoir 22 as best illustrated in FIG. 5. Although cover member 30 is provided for direct access to water reservoir 22, water tank fill port 38 is the primary means for filling the water reservoir 22.

As best illustrated in FIG. 4, cover member 30 includes a compartment 68 which houses a cavity 70 which is shaped and configured to receive a measuring spoon 72. When the measuring spoon 72 is positioned and received within the cavity 70, the spoon 72 presents a smooth flat profile adjacent the upper surface 73 of compartment 68 so as to allow a separate cover member 74 to provide access to the spoon compartment 68. Cover member 74 is hinged in a conventional manner at hinge points 76 and 78 (FIG. 5) and is pivotally rotated between a closed position completely closing compartment 68 and covering measuring spoon 72, and an open position providing access thereto. The measuring spoon compartment 68 is completely housed within cover member 30 for water reservoir 22. Measuring spoon 72 provides easy access to a user for appropriately measuring the amount of coffee grounds to be placed within the brew basket 46 for delivering a pre-determined amount of coffee. FIG. 5 shows cover member 30 in its open position allowing access to water reservoir 22.

Figure 6:
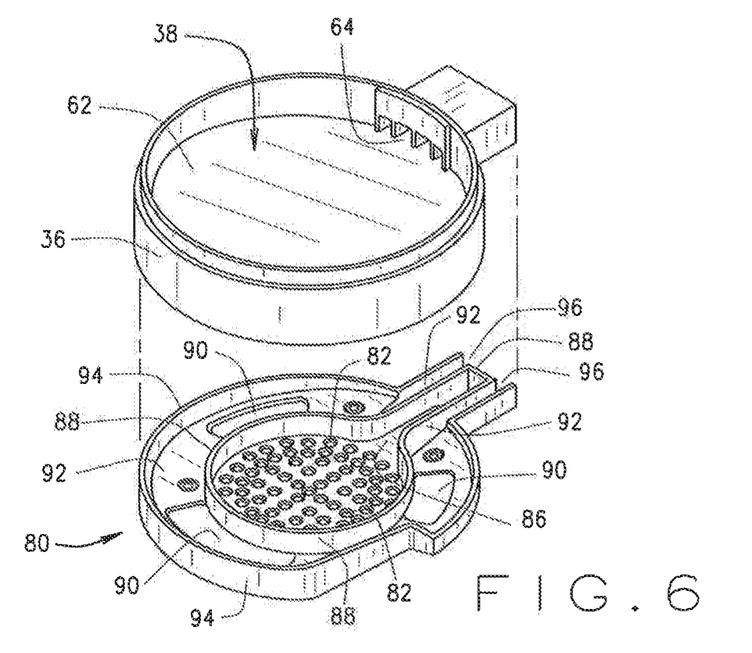
FIG. 6 is an exploded partial perspective view of the present water tank fill port and the present shower head constructed in accordance with the teachings of the present invention.
Figure 7:
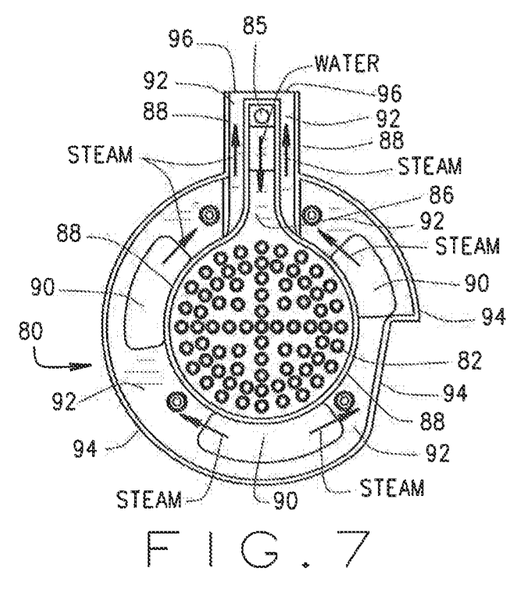
FIG. 7 is a top plan view of the shower head of FIG. 6.
Figure 8:
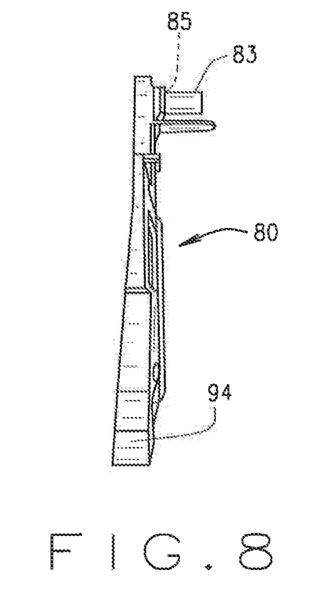
FIG. 8 is a side elevational view of the shower head of FIGS. 6 and 7.

FIGS. 6-8 illustrate the present shower head member 80 which is fixably attached to the cylindrical flange member 36 and sits in a stationary position directly over the brew basket 46 when the brew basket support/door member 40 is in its closed position. The shower head member 80 likewise is in communication with the water reservoir 22 and includes a plurality of openings 82 located at the center portion thereof for providing heated water from the water reservoir 22 directly into the brew basket 46. Water in the water reservoir 22 is heated via heating element 84 and is then transported in a conventional manner through water transporting channels (not shown) from the water reservoir 22 to the shower head member 80. This heated water from water reservoir 22 is directed through conduit(s) 83 and through opening 85 for entrance into flow channel 86 associated with the shower head member 80. Channel 86 is formed by side walls 88 which funnel and direct the heated water to the openings 82. Side walls 88 and flow channel 86 limit and confine the heated water to the openings 82 for delivery to the coffee grounds located within the brew basket 46.

The shower head member 80 likewise includes at least one opening 90 and, preferably, a plurality of openings 90 for allowing stem generated during the brewing cycle within the brew basket 46 to percolate and funnel its way through openings 90 into the shower head member 80. The openings 90 are positioned and located within at least one separate flow channel 92 formed between interior side wall 88 and exterior side wall 94, channel 92 also being in communication with water reservoir 22 and funneling the steam through exit openings 96 at the terminal end portions thereof back into the water reservoir 22. The flow channel 92 captures the steam generated during the brewing cycle and returns such moisture to the water reservoir 22 during the brewing cycle. This eliminates the overflow of steam outside of the coffee maker 10 and provides a mechanism for redirecting this steam back to the water reservoir 22 which then condenses to fill the same. Any number of flow channels 92 and any number of openings 90 can be provided within the flow channels 92 and the size and shape of the openings 90 can likewise vary depending upon the overall shape and configuration of the shower head member 80. The floor member 62 associated with the water tank fill port 38 forms the ceiling member over the top of shower head member 80 thereby closing off the flow channels 86 and 92 from the top and confining the flow of water and steam to their respective flow channels. This moisture recovery system improves performance and likewise aids in refilling the water reservoir 22.

FIGS. 9-11 are perspective and side elevational views of the present coffee maker showing some of the internal components associated therewith. For example, FIGS. 9 and 10 show the water reservoir 22 housed within the vertically oriented housing member 14 and likewise illustrates the heating element 84 located below the water reservoir 22 for heating the water in reservoir 22 during the brewing cycle. The channel opening 98 illustrated in FIG. 10 provides space for conventional water transfer conduits such as conduit 83 for transferring the heated water from water reservoir 22 to the shower head member 80 as previously explained. A warming plate 24 is housed within the horizontally oriented housing member 16 as best illustrated in FIG. 11. The warming plate 24 will keep the coffee carafe 26 warm after the brewing cycle is completed and is controlled through control panel 28. In addition, control electronics 100 in the form of a control PC board and power electronics 102 in the form of a power PC board are likewise housed within the housing unit 12 as best illustrated in FIG. 10. Electronics 100 and 102 along with a conventional power cord (not shown) powers the coffee maker 10 and control panel 28 such that all of the various functions and operations of the coffee maker 10 can be controlled through control panel 28 as previously explained.

It is important to note that the distance X between the outlet of the heating element 84 to the shower head member 80 has been minimized, that is, it has been made as short as possible, so as to improve the heat efficiency of heating element 84 and to minimize heat loss while the heated water travels through conventional tubing to the shower head member 80. By making this distance as small as possible, better overall heating performance and temperature control can be obtained as compared to prior art coffee makers where this distance is not optimized. In one embodiment of the present coffee maker 10, the distance X between the outlet of the heating element 84 to the shower head member 80 is approximately 15.8 centimeters. In similar fashion, the distance Z from the outlet of heater element 84 to the top of the water reservoir full mark 104 is likewise minimized, that is, this distance is maintained as small as possible, so as to again improve performance and more quickly heat the water contained within reservoir 22, In one embodiment, the distance Z is approximately 11.9 centimeters. This again improves the overall performance of coffee maker 10.

It is recognized and anticipated that the electronics 100 and the 102 associated with the present coffee maker as well as other electronics including the heating element 84, the warming plate 24 and the size and configuration of the overall housing 12 can take on a wide variety of different shapes and configurations and the electronics and other electrical elements associated therewith can be conventional units known in the industry. In addition, it is also recognized and anticipated that the control panel 28 can include other features known in the industry, or such control panel can be reduced to simply activating the brewing cycle.

It is also recognized that the overall dimensions of the various components associated with the present coffee maker as well as the specific shape and configuration of the various members associated therewith as discussed above are also subject to wide variations and may be shaped and sized into a wide variety of different sizes and configurations so as to be compatible with, or to conform with, any space limitations associated with built-in appliance cabinets, countertop space, overhanging shelf or cabinet space and the like without impairing the teachings and practice of the present invention. Importantly, it is at least the water tank fill port 38 and its position and location directly over the brew head assembly 32, the specific design of the shower head member 80, and the position and location of the measuring spoon compartment 68 housed totally within the cover member 30 associated with the water reservoir 22 that imparts the novelty associated with the present coffee maker 10. Other variations and modifications to the various components comprising the present coffee maker 10 are likewise envisioned and contemplated.

Thus, there has been shown and described an improved coffee maker 10. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not "as required". Many changes, modifications, variations and other uses and applications of the present invention will, however, become apparent to those skilled in the art after considering the present specification and the accompanying drawings. All such changes, modifications, variations and other uses and applications which do not depart from the spirit and scope of the present invention are deemed to be covered by the present invention which is limited only by the claims which follow.

What is claimed is:

1. A coffee maker for brewing a coffee beverage during a brewing process, the coffee maker comprising:
   a housing member having a front wall and a rear wall;
   a water reservoir located between the front and rear wall of said housing member for holding water for brewing a coffee beverage;
   a brew head assembly attached to the front wall of said housing member in front of said water reservoir, said brew head assembly including a brew basket pivotally movable between an open position providing access to the brew basket and a closed position within said brew head assembly for brewing a coffee beverage, said brew head assembly further including a shower head member located above said brew basket when said brew basket is in its closed position;
   a water reservoir fill port located within said brew head assembly in front of said water reservoir and above said shower head member and said brew basket when said brew basket is in its closed position, said water reservoir fill port being in direct communication with said water reservoir such that a user can pour water into said water reservoir fill port over the top of said shower head member and said brew basket to fill said water reservoir;
   a first cover member providing access to said water reservoir fill port; and
   a second cover member slidably movable between an open position providing access directly into said water reservoir and a closed position preventing direct access to said water reservoir.

2. The coffee maker defined in claim 1 wherein said water reservoir fill port includes an inclined floor member and at least one opening for providing access to said water reservoir, said floor member sloping towards said at least one opening.

3. The coffee maker defined in claim 1 wherein said brew head assembly includes a brew basket support member for holding said brew basket, said support member being selectively pivotally movable between an open position providing access to said brew basket and a closed position wherein said brew basket is housed within said brew head assembly for brewing a coffee beverage.

4. The coffee maker defined in claim 1 wherein said shower head member includes a plurality of openings for delivering heated water to said brew basket and at least one additional opening for allowing steam generated within said brew basket during the brewing process to pass therethrough, said at least one additional opening providing access to at least one flow channel within said shower head member, said at least one flow channel being in communication with said water reservoir for channeling steam generated during the brewing process back to said water reservoir.

5. The coffee maker defined in claim 4 wherein said plurality of openings for delivering heated water to said brew basket are located in a flow channel separate and apart from the at least one flow channel for channeling steam generated during the brewing process back to said water reservoir.

6. The coffee maker defined in claim 5 wherein said shower head member is fixedly mounted within said brew head assembly.

7. The coffee maker defined in claim 1 wherein said second cover member includes a separate compartment for holding and storing a measuring spoon.

8. The coffee maker defined in claim 1 including a heating element housed within said housing member for heating water in said water reservoir, said heating element being positioned and located within said housing member such that the distance between said heating element and said shower head member is minimized.

9. The coffee maker defined in claim 8 wherein said water reservoir includes a full mark and the position and location of said heating element within said housing member is such that the distance between said heating element and said full mark is minimized.

10. The coffee maker defined in claim 1 wherein said housing member includes a receptacle for holding a coffee carafe below said brew basket when said brew basket is in its closed position, and a warming plate for heating a coffee carafe when placed within said receptacle.

11. The coffee maker defined in claim 1 including electronics and a control panel for controlling the operation of the coffee maker.

12. A coffee maker for brewing a coffee beverage during a brewing process comprising:
    a housing member having a front wall portion and a rear wall portion;
    a water reservoir located between the front and rear wall portions of said housing member for holding water for brewing a coffee beverage;
    a brew head assembly attached to the front wall portion of said housing member in front of said water reservoir, said brew bead assembly including a brew basket selectively movable between an open position providing access to said brew basket and a closed position within said brew head assembly for brewing a coffee beverage, and a shower head member located above said brew basket when said brew basket is in its closed position;
    said shower head member including a first flow channel having a plurality of openings formed therewithin for receiving and delivering heated water from the water reservoir to said brew basket, and at least one second flow channel having at least one opening associated therewith for allowing steam generated within the brew basket during the brewing process to pass therethrough, said at least one second flow channel being in communication with said water reservoir for channeling the steam and any moisture condensed therefrom back to said water reservoir;

a water reservoir fill port located within said brew head assembly in front of said water reservoir and above said shower head member and said brew basket when said brew basket is in its closed position, said water reservoir fill port being in direct communication with said water reservoir such that a user can pour water into said water reservoir fill port over the top of said shower head member and said brew basket to fill said water reservoir;

a first cover member providing access to said water reservoir fill port;

a second cover member slidably movable between an open position providing access directly into said water reservoir and a closed position preventing direct access to said water reservoir.

13. The coffee maker defined in claim 12 wherein said second cover member includes a separate compartment for holding and storing a measuring spoon.

14. The coffee maker defined in claim 13 including a lid member for providing access to said separate compartment housed within said second cover member.

15. A coffee maker for brewing a coffee beverage during a brewing process comprising:

a housing member having a vertically oriented component and a horizontally oriented component, said vertically oriented component including a front wall portion and a rear wall portion, said horizontally oriented component including a receptacle for holding a coffee carafe;

a water reservoir located between the front and rear wall portions of said vertically oriented housing component for holding water for brewing a coffee beverage;

a brew head assembly attached to the front wall portion of the vertically oriented housing component in front of said water reservoir, said brew head assembly including a cylindrically shaped flange member for housing a shower head member, and a brew basket support member for holding a brew basket therewithin, said brew basket support member functioning as a door member and being selectively pivotally movable between an open position providing access to the brew basket and a closed position wherein the brew basket is housed within said brew head assembly underneath said shower head member, said brew basket support member mating with said cylindrically shaped flange member when said brew basket support member is in its closed position;

a water reservoir fill port located within the cylindrically shaped flange member of said brew head assembly above said shower head member and in front of said water reservoir, said water reservoir fill port being in direct communication with said water reservoir such that a user can pour water directly into said water reservoir fill port over the top of said shower head member to fill the water reservoir, said water reservoir fill port including an inclined floor member and at least one opening for providing access to said water reservoir, said inclined floor member forming a ceiling member over the top of said shower head member;

said shower head member including a first flow channel in communication with said water reservoir having a plurality of openings associated therewith for delivering heated water to said brew basket, and at least one second flow channel having at least one opening associated therewith for allowing steam generated within the brew basket during the brewing process to pass therethrough, said at least one second flow channel being in communication with said water reservoir for channeling the steam generated within the brew basket back to said water reservoir;

a first cover member for providing access to said water reservoir fill port;

and a second cover member providing access directly to said water reservoir, said second cover member including a separate compartment for holding and storing a measuring spoon therewithin.

16. The coffee maker defined in claim 15 wherein said brew basket support member is selectively pivotally rotatable through approximately 160° of rotation, said brew basket support member pivoting forwardly and laterally relative to said water reservoir fill port.

17. The coffee maker defined in claim 15 wherein the separate compartment housed within said second cover member for holding and storing a measuring spoon therewithin includes a separate lid member for providing access to said separate compartment.

* * * * *